(12) United States Patent
Clute

(10) Patent No.: US 7,806,440 B2
(45) Date of Patent: Oct. 5, 2010

(54) DUAL SPOOL RETRACTOR IN BELT-IN-SEAT

(75) Inventor: Gunter K. Clute, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 235 days.

(21) Appl. No.: 12/111,385

(22) Filed: Apr. 29, 2008

(65) Prior Publication Data
US 2009/0267332 A1   Oct. 29, 2009

(51) Int. Cl.
*B60R 21/231* (2006.01)
*B60R 22/46* (2006.01)

(52) U.S. Cl. ............... 280/806; 280/807; 280/808; 280/730.2; 297/468; 297/480; 297/483

(58) Field of Classification Search .......... 280/730.2, 280/806–808; 297/468, 469, 479, 480, 483
See application file for complete search history.

(56) References Cited

U.S. PATENT DOCUMENTS

| | | | |
|---|---|---|---|
| 4,135,683 A * | 1/1979 | Stephenson et al. | 242/378.4 |
| 4,391,420 A * | 7/1983 | Ahad et al. | 242/378.4 |
| 4,399,955 A * | 8/1983 | Miskowicz et al. | 242/378.4 |
| 4,431,233 A * | 2/1984 | Ernst | 297/468 |
| 4,470,556 A * | 9/1984 | Matsuoka | 242/378.4 |
| 5,401,072 A * | 3/1995 | Farrand | 296/68.1 |
| 5,611,604 A * | 3/1997 | Thomas et al. | 297/478 |
| 5,704,638 A * | 1/1998 | Lane, Jr. | 280/730.2 |
| 6,164,581 A * | 12/2000 | Freeman et al. | 242/384.4 |
| 6,168,195 B1 * | 1/2001 | Okazaki et al. | 280/733 |
| 6,305,713 B1 * | 10/2001 | Pywell et al. | 280/801.1 |
| 6,336,657 B1 * | 1/2002 | Akaba et al. | 280/733 |
| 6,382,666 B1 * | 5/2002 | Devonport | 280/733 |
| 6,406,059 B1 * | 6/2002 | Taubenberger et al. | 280/733 |
| 6,425,602 B1 * | 7/2002 | Al-Amin et al. | 280/730.2 |
| 6,623,037 B2 * | 9/2003 | Ritters et al. | 280/801.1 |
| 6,655,745 B2 * | 12/2003 | Fohrenkamm et al. | 297/481 |
| 6,692,020 B2 * | 2/2004 | Decomps et al. | 280/733 |
| 6,767,055 B1 * | 7/2004 | Sparks | 297/216.14 |
| 7,201,399 B2 * | 4/2007 | Frank et al. | 280/801.1 |
| 7,413,220 B2 * | 8/2008 | Itoga et al. | 280/742 |
| 7,429,012 B2 * | 9/2008 | Loffler et al. | 242/374 |
| 7,540,537 B2 * | 6/2009 | Bell | 280/806 |
| 7,607,687 B2 * | 10/2009 | Clute et al. | 280/733 |

(Continued)

FOREIGN PATENT DOCUMENTS

DE         199 15 275         10/2000

(Continued)

*Primary Examiner*—Paul N Dickson
*Assistant Examiner*—Nicole Verley
(74) *Attorney, Agent, or Firm*—Sally J Brown; Brinks Hofer Gilson & Lione

(57) ABSTRACT

A restraint assembly of a type including a seat belt assembly and a side impact air bag assembly. The seat belt assembly and side impact assembly are preferably mounted to a motor vehicle seat. The seat belt assembly includes one or two retractors, preferably each having roto pretensioners. A single gas source is used to actuate retractor pretensioning functions, as well as providing a gas source for initiating the production of inflation gas for the side impact air bag assembly. Preferably, these elements are all mounted to a motor vehicle seat.

20 Claims, 4 Drawing Sheets

U.S. PATENT DOCUMENTS

| | | | |
|---|---|---|---|
| 7,631,831 B2* | 12/2009 | Hiramatsu | 242/374 |
| 2003/0160498 A1* | 8/2003 | Boelstler et al. | 297/483 |
| 2004/0036345 A1* | 2/2004 | Herberg et al. | 297/480 |
| 2006/0208124 A1 | 9/2006 | Clute | |
| 2007/0102910 A1* | 5/2007 | Nezaki et al. | 280/733 |
| 2007/0290535 A1* | 12/2007 | Meredith et al. | 297/217.1 |
| 2008/0217457 A1 | 9/2008 | Clute et al. | |
| 2010/0025977 A1* | 2/2010 | Tomita | 280/806 |

FOREIGN PATENT DOCUMENTS

EP          1 128 933          6/2002

* cited by examiner

DUAL SPOOL RETRACTOR IN BELT-IN-SEAT

FIELD OF THE INVENTION

This invention relates to automotive safety restraint systems and, in particular, to an active three-point seat belt system integrated with a side impact air bag.

BACKGROUND AND SUMMARY OF THE INVENTION

Numerous designs of passive and active automotive occupant restraint systems are known for enhancing occupant protection in the event of a vehicle crash. Passive systems such as inflatable restraints such as air bags and automatically deployed seat belt systems are known. Active seat belt systems have been use for many decades and are manually deployed by the occupant. The conventional seat belt system uses three-points of connection with the vehicle structure and incorporates a lap belt section for engaging the occupant's lower torso and a shoulder belt section for engaging the occupant's upper torso. The seat belt restrains excursion of the occupant in the event of a vehicle impact or rollover event. In order to enhance the comfort and convenience provided by the seat belt system, retractors are normally used which permit the belt webbing to be extracted from and retracted onto the retractor, allowing movement of the occupant while maintaining the belt in close contact with the occupant. An inertia sensitive actuator locks the retractors when an impact or rollover event is detected, preventing free extraction of webbing in that vehicle condition.

Conventional three-point belt systems may use a single seat belt retractor for storing the seat belt which is used with a sliding latch plate. When fastening the belt, the occupant grasps the latch plate, inserts it to the buckle and the single retractor, usually coupled to the shoulder belt portion of the seat belt, takes up slack in the webbing while allowing movement for comfort and convenience of the occupant. In some seat belt systems, particularly those used in luxury vehicles, a two-retractor system is provided. For these systems, the latch plate is fixed to the webbing and separate upper and lower belt retractors are provided for the shoulder belt and lap belt sections, respectively. These systems do not require the latch plate to slide along the webbing.

Seat belt pretensioners are often used which, upon the detection of a condition leading to an imminent impact or rollover, or in the event of an actual vehicle impact or rollover, cause seat belt webbing to be automatically and forceably retracted to tighten the belt against the occupant. Such pretensioning can improve seat belt system performance. Electric motors may be used for so-called pre-pretensioning when an accident condition is detected. These systems are reversible so that the pretensioning effect can be reversed when the accident situation is no longer present. When immediate and powerful pretensioning action is required, for example upon the occurrence of a crash, gas assisted pretensioning devices are typically used. Two general types are used; a roto pretensioner is actuated by a gas source and uses a series of balls or other actuated devices which engage with the spool of a retractor to forceably cause retraction rotation of the spool. Another type uses a gas source acting on a piston in a cylinder to pull down a seat belt anchorage upon a deployment signal.

In addition to the advanced types of seat belt systems described previously, motor vehicles are now frequently equipped with side impact air bags. These devices include lower torso air bags types often mounted to the vehicle door or B-pillar trim, or mounted directed to the seat. These devices are often used in conjunction with side curtain air bags or other devices for restraining the upper torso and head of the occupant upon a side impact event.

For deployable safety devices including the pretensioners and air bags described previously which are examples of pyrotechnic safety device (PSDs), a crash sensor is coupled with a crash controller which has electrical signal firing lines which send crash signals to the various PSDs. Each of these firing lines requires dedicated vehicle wiring and separate inflator devices for creating inflation or deployment gas. Multiples of these PSDs add cost and complexity to the motor vehicle occupant restraint system.

In accordance with the present invention, vehicle components and system simplicity is achieved through combining a seat belt pretensioning system with an air bag, preferably a side impact air bag. In a preferred embodiment, both the side impact air bag and seat belt system are mounted to a motor vehicle seat. The seat belt system may include a single retractor for the shoulder belt section or a dual retractor system. A roto pretensioner is preferably used with one or both retractors, although other types of pretensioners can be used. A side impact air bag is provided and the pretensioner and air bag are actuated through a common gas source controlled by a single firing line. Significant efficiencies in design, weight, and reduction of complexity are provided by use of the common inflator with its single firing line to actuate both the pretensioner and side impact air bag. In another embodiment of this invention, two retractors are provided, each having roto pretensioners. As in the prior example, both the retractor pretensioners and side impact air bag are actuated by a common inflation gas source.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
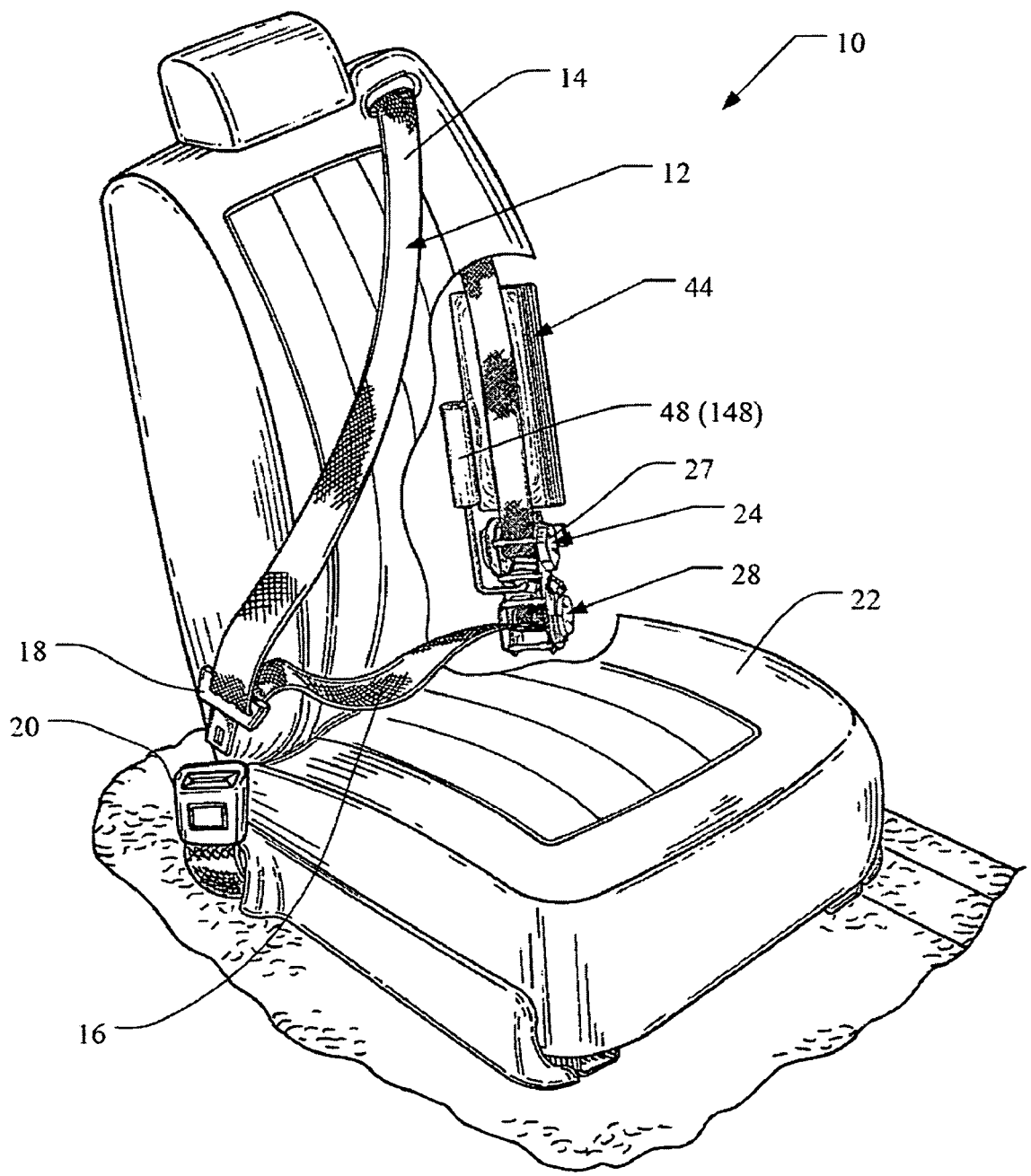
FIG. 1 is a pictorial view of a restraint system in accordance with the present invention shown mounted to a vehicle seat and showing various components in a cut away manner.
Figure 2:
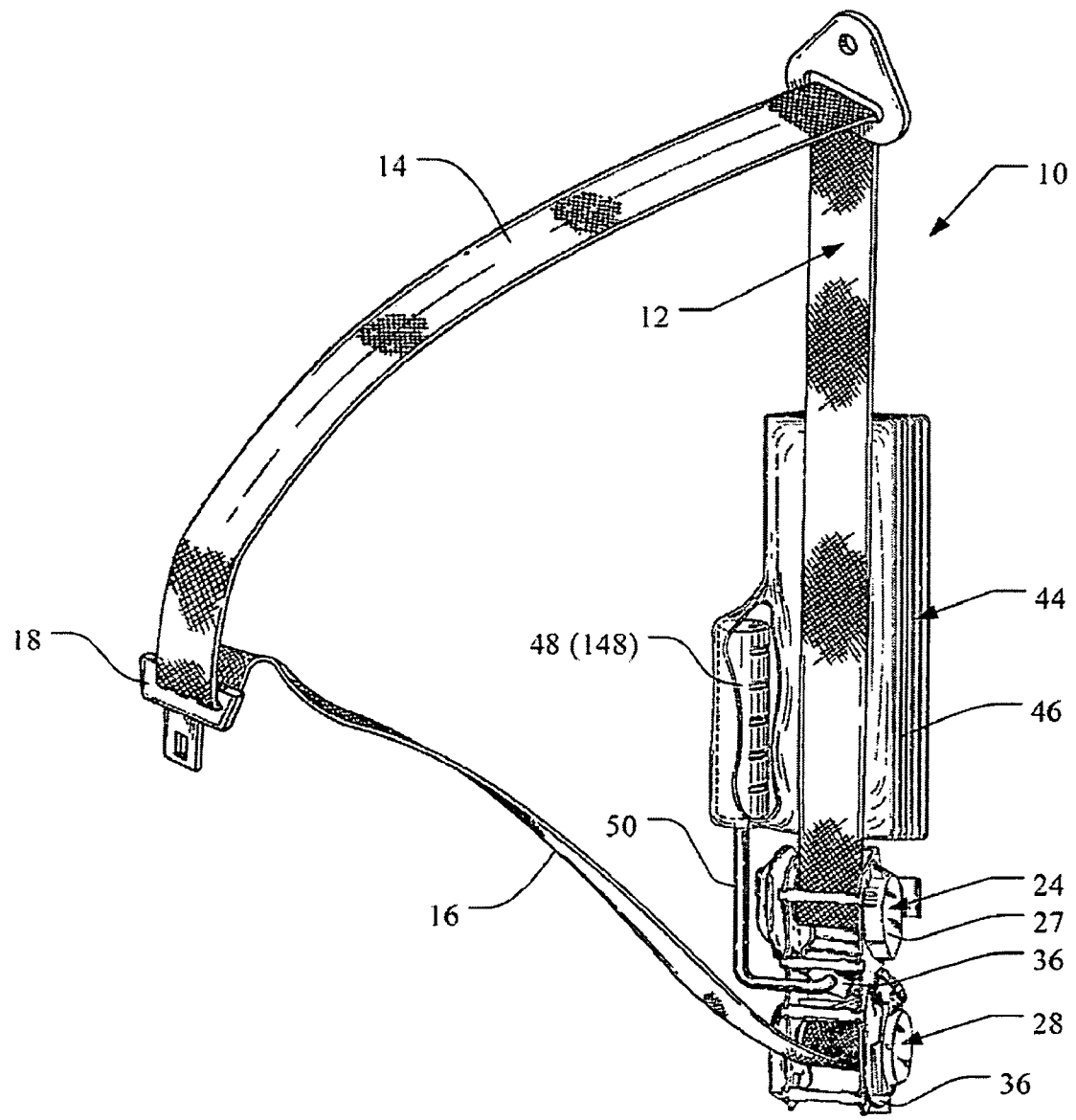
FIG. 2 is an assembly drawing of the restraint system in accordance with the present invention, shown apart from the vehicle seat.

A motor vehicle restraint system in accordance with the present invention is illustrated in FIG. 1 and generally designed by reference number 10. Restraint system 10 principally comprises seat belt webbing 12, divided into an upper or shoulder belt section 14, and a lower or lap belt section 16, for respectively restraining the upper and lower torso of a motor vehicle occupant. Restraint system 10 further includes latch plate 18 which can be affixed to seat belt buckle 20 in a conventional manner.

In use, as is conventional, an occupant sitting in seat 22 grasps latch plate 18, extends the shoulder belt and lap belt sections 14 and 16 across their body and fastens the latch plate into buckle 20.

Figure 3:
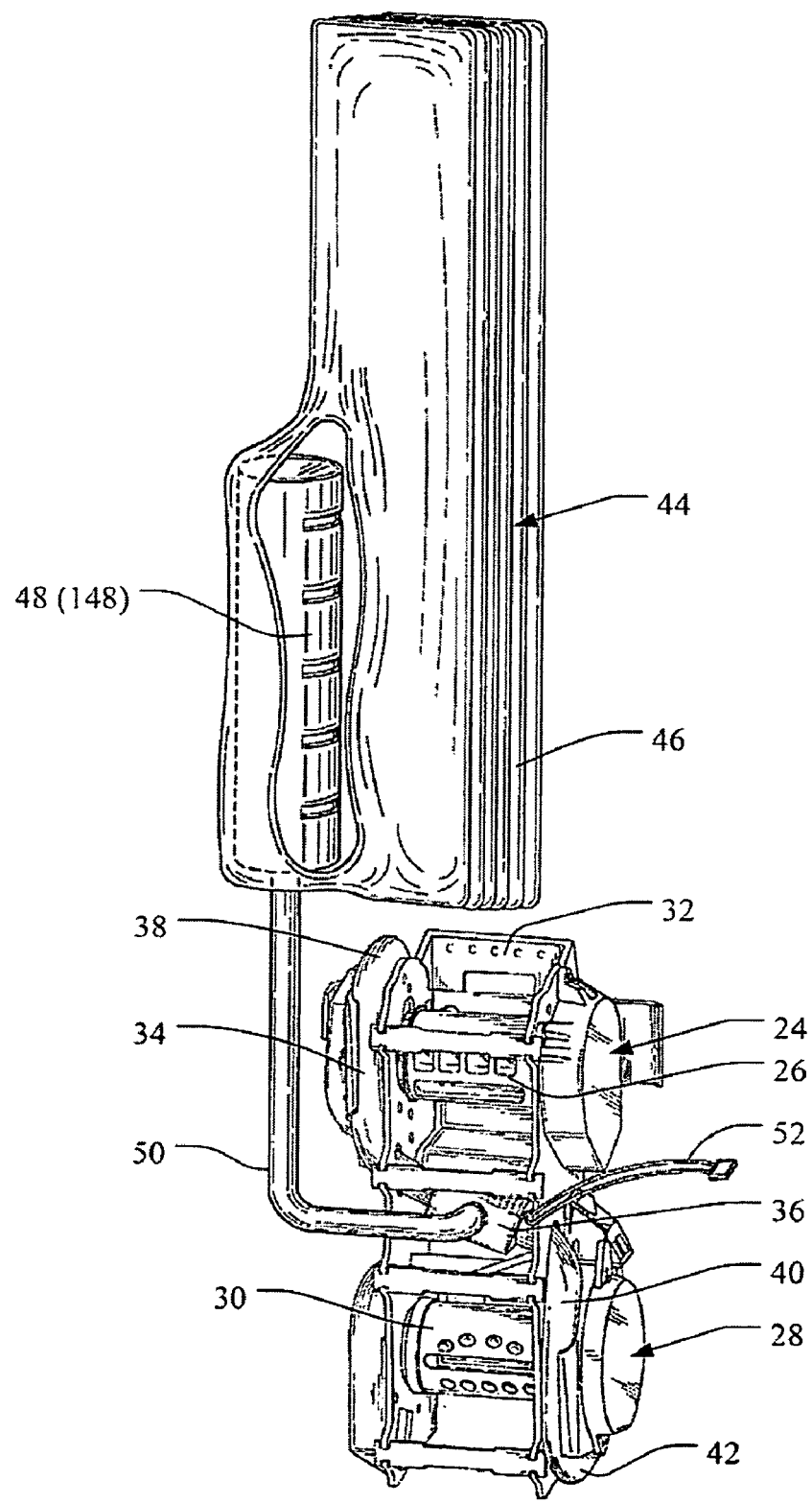
FIG. 3 is a pictorial illustration of a dual spool retractor and side impact air bag in accordance with the present invention.
Figure 4:
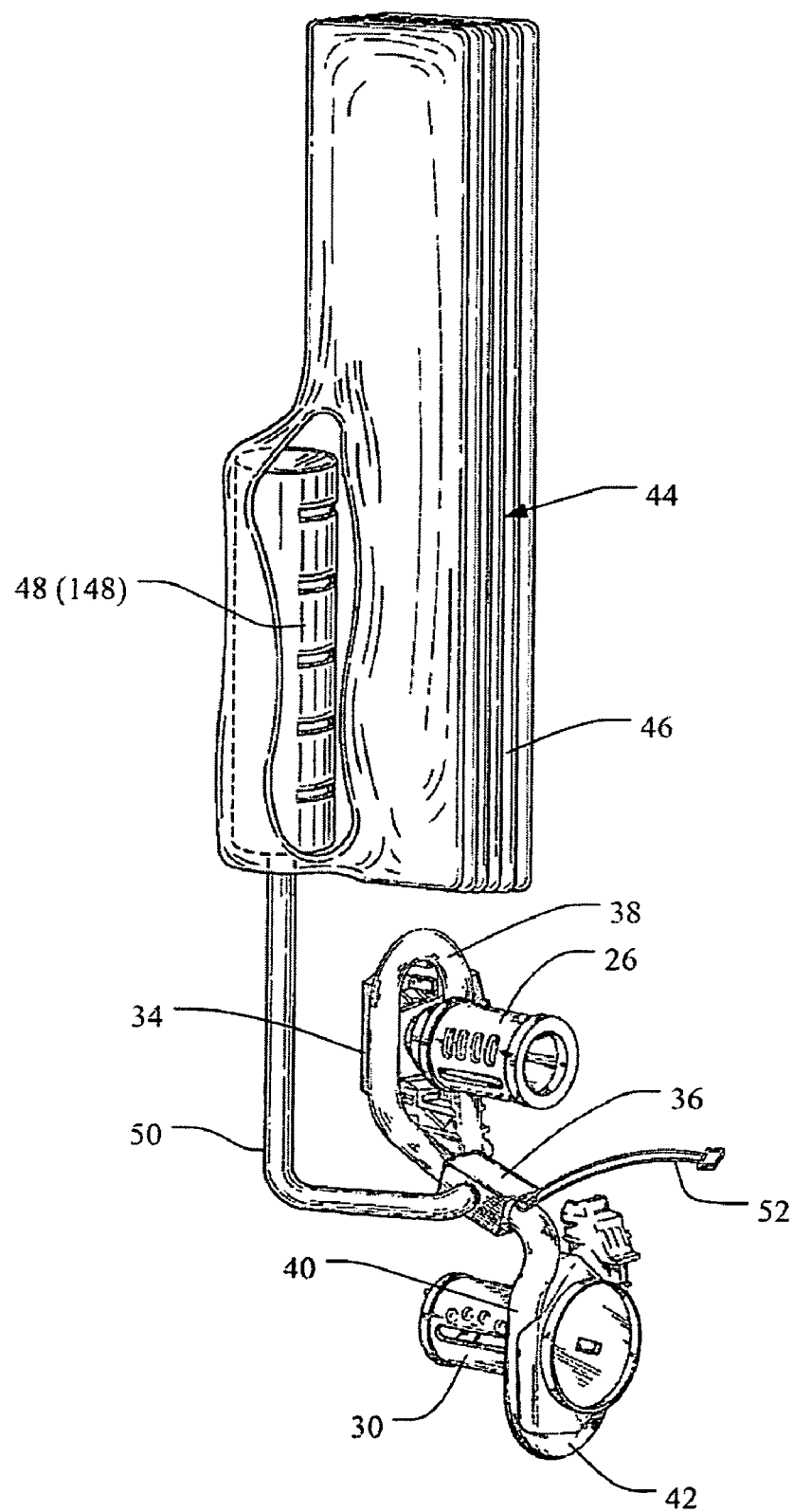
FIG. 4 is a pictorial view of a dual spool retractor used in connection with the present invention.

With reference to FIGS. 1 and 3, the end of shoulder belt section 14 of the seat belt webbing is affixed to shoulder belt retractor 24 which has a spool 26 upon which the seat belt webbing 12 is wrapped. Shoulder belt retractor 24 operates in a conventional manner for stowing webbing to allow extension and retraction of the webbing as the belt system is deployed or while ii is not being used, and further permits extension and retraction of the webbing as the occupant moves for providing comfort and convenience. Shoulder belt retractor 24 would include, in accordance with conventional retractor design features, a rewind spring 27 and an emergency locking mechanism (not shown) which is typically inertia sensitive. These retractor control devices permit free extension and retraction of the seat belt webbing until a dynamic vehicle condition is encountered at which time the seat belt retractor locks to restrict extraction of webbing.

As further illustrated in FIGS. 1 and 3, restraint assembly 10 further preferably includes a lap belt retractor 28 having spool 30. Various designs of lap belt retractor 28 may be provided. Lap belt retractor 28 provides a belt anchorage for restraining the lap belt portion 16 of the seat belt webbing. Lap belt retractor 28 may also incorporate features described previously in connection with shoulder belt retractor 24 such as emergency locking mechanisms and a rewind spring to permit free extension and retraction of the webbing. However, in one preferred embodiment, the lap belt retractor 28 would not include such features to permit free extension and retraction of the webbing, but rather would be provided for a pretensioning function, as will be described further.

In a preferred embodiment, shoulder belt retractor 24 and lap belt retractor 28 are mounted to a common frame 32. This arrangement is shown in Applicant's copending U.S. patent application Ser. No. 11/082,567, filed on Mar. 17, 2005 entitled "Dual Spool Retractor", which is hereby incorporated by reference.

Shoulder belt retractor 24 includes a roto pretensioner 34 which serves to retract or pretension shoulder belt section 14 of the webbing upon the detection of an impact condition. Roto pretensioner 34 is of generally conventional construction and is powered by deployment gas generated by a gas source 36 which communicates with a curved tube 38. In accordance with conventional roto pretensioner design principles, a series of balls (not shown) are loaded into tube 38 and upon forcibly being moved along the tube 38 through a deployment gas source, these balls interact with a sprocket (not shown) affixed to spool 26 to cause pretensioning retraction of the retractor. This operating approach is also described in the previously mentioned co-pending patent application incorporated by reference herein.

Lap belt retractor 28 also preferably includes roto pretensioner 40 and tube 42 which operates in a manner equivalent to that described in connection with roto pretensioner 34. In accordance with the present invention, both roto pretensioners 34 and 40 are actuated by deployment gas from a single gas source 36. Thus, in response to a crash signal, initiation of gas source 36 via electrical signals on firing line 52 provides a rapid source of high pressure deployment gas which is sent through tubes 38 and 42 to cause pretensioning retraction of both retractors 24 and 28.

Restraint system 10 in accordance with the present invention further includes side impact air bag assembly 44. Air bag assembly 44 includes folded air bag 46 and inflation tube 48. In accordance with the present invention, inflation tube 48 communicates directly with gas source 36 via tube 50 and receives deployment gas pressure from the same source. Thus, upon actuator of gas source 36, the generated gas, in addition to being provided to roto pretensioners 34 and 40, further provides inflation gas to deploy air bag 46. Air bag assembly 44 may also include a so-called cold gas inflator 148 taking the place of inflator tube 48. Inflator 148 would generate gas upon receiving high pressure gas from gas generator 36, but does not require a separate firing line. Thus, for an embodiment of system 10 using cold gas inflator 148, gas pressure from gas source 36 initiates the release of inflation gas. Such a configuration provides the benefit that gas source 36 does not need to have the gas generation capacity or proximity to air bag 46 to provide rapid inflation of the air bag, yet preserves the benefit of using a single firing line 52 to inflate the air bag and provide belt pretensioning.

In a preferred embodiment of the present invention, each of the aforementioned components including seat belt webbing 12, retractors 24 and 28, and air bag assembly 44 are mounted to seat 22. Thus, when the seat is moved fore and aft to adjust to various occupants sizes, each of these components moves with the occupant. As mentioned previously, a fundamental benefit of the system in accordance with this invention is the use of a common gas source 36 and its associated firing line 52 to provide both seat belt pretensioning functions and side impact air bag inflation.

Various alternative configurations of the restraint assembly in accordance with this invention may be implemented while implementing the novel features of the present invention. For example, lap belt retractor 28 may be eliminated in favor of a fixed lap belt anchorage. In such an embodiment, gas source 36 would provide a gas source for shoulder belt retractor roto pretensioner 34 and would directly inflate or initiate inflation of air bag assembly 44. Such a configuration would not provide dual pretensioning features but does provide the advantage of a common gas source and firing line for providing both seat belt pretensioning and side impact air bag inflation functions.

Further alternate embodiments of the present invention include various configurations for lap belt retractor 28. Retractor 28 includes spool 30 which may be fixed to the retractor and is only actuated to rotate in a pretensioning rotational direction under the influence of roto pretensioner 40. In this way, the lap belt retractor does not perform the function of a typical retractor of permitting free extension and retraction of webbing, but does provide the benefit of roto pretensioning of lap belt section 16. Other configurations would provide a fully functioning lap belt retractor 28 having a rewind spring for free extension retraction of the webbing and an emergency locking mechanism for locking the lap belt retractor 28 upon specific vehicle dynamic conditions. For such a retractor assembly, it is possible further to use a common retractor control device as also described in Applicant's copending U.S. patent application Ser. No. 11/714,399, filed on Mar. 6, 2007 entitled "Inertia Actuator for Seat Belt Retractor", which is also hereby incorporated by reference.

While the above description constitutes the preferred embodiment of the present invention, it will be appreciated that the invention is susceptible to modification, variation and change without departing from the proper scope and fair meaning of the accompanying claims.

The invention claimed is:

1. A motor vehicle occupant restraint system of a type including a seat belt assembly and an air bag, the seat belt assembly having webbing defining a shoulder belt section adapted to extend across the upper torso of an occupant and a lap belt section adapted to extend across the lower torso of the occupant, the restraint system comprising:

a first retractor connected with an end of the shoulder belt section of the seat belt webbing and having a spool for storing the webbing and allowing extension and retraction of the webbing, a seat belt anchorage connected with an end of the lap belt section of the seat belt webbing for connecting the webbing to structure of the vehicle, a gas source mounted to the first retractor for generating a deployment gas in response to a deployment signal from a firing line, a first pretensioner for retracting the webbing for pretensioning the webbing, the first pretensioner actuated by the deployment gas, and the air bag providing impact protection independent of the seat belt assembly and being deployable upon generation of the deployment gas by the gas source wherein the deployment signal from the firing line causes the gas source to provide the deployment gas which actuates the first pretensioner and initiates deployment of the air bag.

2. A motor vehicle occupant restraint system in accordance with claim 1 further comprising each of the first retractor, the anchorage, the gas source, and the air bag mounted to a motor vehicle seat.

3. A motor vehicle occupant restraint system in accordance with claim 1 further comprising, the first pretensioner in the form of a roto-pretensioner coupled with the first retractor spool.

4. A motor vehicle occupant restraint system in accordance with claim 1 further comprising, the anchorage in the form of a second retractor connected with the end of the lap belt section of the seat belt webbing and having a second spool, and a second pretensioner acting on the second retractor spool for retracting the webbing for pretensioning the webbing, the second pretensioner actuated by the deployment gas from the gas source.

5. A motor vehicle occupant restraint system in accordance with claim 4 further comprising the second pretensioner in the form of a roto-pretensioner.

6. A motor vehicle occupant restraint system in accordance with claim 4 wherein the gas source communicates with the first pretensioner by a first tube for transferring the deployment gas to the first pretensioner and with the second pretensioner by a second tube for transferring the deployment gas to the second pretensioner and by a third tube communicating with the air bag.

7. A motor vehicle occupant restraint system in accordance with claim 1 further comprising the air bag having a cold gas inflator actuated to generate inflation gas upon generation of the deployment gas by the gas source.

8. A motor vehicle occupant restraint system of a type including a seat belt assembly and an air bag, the seat belt assembly having webbing defining a shoulder belt section adapted to extend across the upper torso of an occupant and a lap belt section adapted to extend across the lower torso of the occupant, the restraint system comprising:

a first retractor connected with an end of the shoulder belt section of the seat belt webbing and having a spool for storing the webbing and allowing extension and retraction of the webbing, a seat belt anchorage connected with an end of the lap belt section of the seat belt webbing for connecting the webbing to structure of the vehicle, a gas source mounted to the first retractor for generating a deployment gas in response to a deployment signal from a firing line, a first pretensioner connected with the first retractor spool for retracting the webbing for pretensioning the webbing, the first pretensioner actuated by the deployment gas, and the air bag providing impact protection independent of the seat belt assembly and being deployable upon generation of the deployment gas by the gas source wherein the deployment signal from the firing line causes the gas source to provide the deployment gas which actuates the first pretensioner and initiates deployment of the air bag.

9. A motor vehicle occupant restraint system in accordance with claim 8 further comprising each of the first retractor, the anchorage, the gas source, and the air bag mounted to a motor vehicle seat.

10. A motor vehicle occupant restraint system in accordance with claim 8 further comprising, the first pretensioner in the form of a roto-pretensioner.

11. A motor vehicle occupant restraint system in accordance with claim 8 further comprising, the anchorage in the form of a second retractor connected with the end of the lap belt section of the seat belt webbing and having a second spool, and a second pretensioner acting on the second retractor spool for retracting the webbing for pretensioning the webbing, the second pretensioner actuated by the deployment gas from the gas source.

12. A motor vehicle occupant restraint system in accordance with claim 11 further comprising the second pretensioner in the form of a roto-pretensioner.

13. A motor vehicle occupant restraint system in accordance with claim 11 wherein the gas source communicates with the first pretensioner by a first tube for transferring the deployment gas to the first pretensioner and with the second pretensioner by a second tube for transferring the deployment gas to the second pretensioner and by a third tube communicating with the air bag.

14. A motor vehicle occupant restraint system in accordance with claim 8 further comprising the air bag having a cold gas inflator actuated to generate inflation gas upon generation of deployment gas by the gas source.

15. A motor vehicle occupant restraint system of a type including a seat belt assembly and a side impact air bag, the seat belt assembly having webbing defining a shoulder belt section adapted to extend across the upper torso of an occupant and a lap belt section adapted to extend across the lower torso of the occupant, the restraint system comprising:

a gas source for providing a deployment gas upon a deployment signal from a firing line, a first retractor connected with an end of the shoulder belt section of the seat belt webbing and having a first spool for storing the webbing and allowing extension and retraction of the webbing, a first pretensioner connected with the first retractor spool for retracting the webbing for pretensioning the webbing, the first pretensioner actuated by the deployment gas, a second retractor coupled to an end of the lap belt section of the belt webbing and having a second spool, a second pretensioner coupled to the second retractor spool for retracting the webbing for pretensioning the webbing, the second pretensioner actuated by the deployment gas, and a side impact air bag providing impact protection independent of the seat belt assembly and being deployable upon initiation by the deployment gas from through the gas source wherein the deployment signal from the firing line causes the gas source to provide the deployment gas which actuates the first pretensioner and initiates deployment of the air bag.

16. A motor vehicle occupant restraint system in accordance with claim 15 further comprising each of the first retractor, the second retractor, the gas source, and the side impact air bag mounted to a motor vehicle seat.

17. A motor vehicle occupant restraint system in accordance with claim 15 further comprising, the first pretensioner in the form of a roto-pretensioner.

18. A motor vehicle occupant restraint system in accordance with claim 15 further comprising the second pretensioner in the form of a roto-pretensioner.

19. A motor vehicle occupant restraint system in accordance with claim 15 further comprising the side impact air bag having a cold gas inflator actuated to generate inflation gas upon generation of gas by the inflator.

20. A motor vehicle occupant restraint system in accordance with claim 15 wherein the gas source communicates with the first pretensioner by a first tube for transferring the deployment gas to the first pretensioner and with the second pretensioner by a second tube for transferring the deployment gas to the second pretensioner and by a third tube communicating with the air bag.

* * * * *